United States Patent
Cao et al.

(10) Patent No.: US 11,109,093 B2
(45) Date of Patent: *Aug. 31, 2021

(54) METHOD AND APPARATUS FOR PROVIDING INFORMATION ASSOCIATED WITH MEDIA CONTENT

(71) Applicant: ALIBABA GROUP HOLDING LIMITED, Grand Cayman (KY)

(72) Inventors: Dan Cao, Hangzhou (CN); Wanxi Ren, Hangzhou (CN); Zizhao Lei, Hangzhou (CN); Xinhui Long, Hangzhou (CN); Xiangfu Li, Hangzhou (CN); Weiming Luo, Hangzhou (CN); Jun Luo, Hangzhou (CN); Haitao Cao, Hangzhou (CN)

(73) Assignee: ALIBABA GROUP HOLDING LIMITED, George Town (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/741,529

(22) Filed: Jan. 13, 2020

(65) Prior Publication Data

US 2020/0221162 A1  Jul. 9, 2020

Related U.S. Application Data

(63) Continuation of application No. 16/421,428, filed on May 23, 2019, now Pat. No. 10,536,744, which is a
(Continued)

(30) Foreign Application Priority Data

Sep. 28, 2014  (CN) .......................... 201410509697.5

(51) Int. Cl.
*H04N 21/436* (2011.01)
*G06Q 30/02* (2012.01)
(Continued)

(52) U.S. Cl.
CPC .......... *H04N 21/436* (2013.01); *G06Q 30/02* (2013.01); *G06Q 30/0267* (2013.01);
(Continued)

(58) Field of Classification Search
CPC ....................... H04N 21/436; H04N 21/64707
See application file for complete search history.

(56) References Cited

U.S. PATENT DOCUMENTS

| 8,750,838 B1 | 6/2014 | Breau et al. |
| 2002/0077896 A1 | 6/2002 | Liu et al. |

(Continued)

FOREIGN PATENT DOCUMENTS

| CN | 101374090 A | 2/2009 |
| CN | 102523501 A | 6/2012 |

(Continued)

OTHER PUBLICATIONS

Extended European Search Report in European Application No. 15843538.8-1905, pursuant to Rule 62 EPC, the Supplementary European Search Report (Art 153(7) EPC) and the European Search Opinion, dated Jun. 16, 2017 (10 pages).
(Continued)

*Primary Examiner* — Nasser M Goodarzi
*Assistant Examiner* — Adil Ocak
(74) *Attorney, Agent, or Firm* — Finnegan, Henderson, Farabow, Garrett & Dunner, LLP

(57) ABSTRACT

Systems and methods are provided for providing information associated with media contents are provided. The method comprises broadcasting a communication address associated with a playing device configured to play the media contents, the broadcasted communication address enables a user terminal device to communicate with the playing device; receiving, from the user terminal device, a request to acquire information associated with the media
(Continued)

contents; determining an identifier associated with the information; and transmitting the identifier to the user terminal device. The identifier enables the user terminal device to acquire the information.

24 Claims, 11 Drawing Sheets

Related U.S. Application Data continuation of application No. 14/864,308, filed on Sep. 24, 2015, now Pat. No. 10,306,300.

(51) Int. Cl.
| | |
|---|---|
| H04N 21/41 | (2011.01) |
| H04N 21/422 | (2011.01) |
| H04N 21/4722 | (2011.01) |
| H04N 21/658 | (2011.01) |
| H04N 21/81 | (2011.01) |
| H04N 21/8352 | (2011.01) |
| H04N 21/858 | (2011.01) |
| H04N 21/426 | (2011.01) |
| H04N 21/462 | (2011.01) |
| H04N 21/84 | (2011.01) |

(52) U.S. Cl.
CPC ... *H04N 21/4126* (2013.01); *H04N 21/42202* (2013.01); *H04N 21/42684* (2013.01); *H04N 21/4622* (2013.01); *H04N 21/4722* (2013.01); *H04N 21/6581* (2013.01); *H04N 21/812* (2013.01); *H04N 21/8352* (2013.01); *H04N 21/84* (2013.01); *H04N 21/8586* (2013.01)

(56) References Cited

U.S. PATENT DOCUMENTS

| | | | |
|---|---|---|---|
| 2006/0103507 | A1 | 5/2006 | Forsberg |
| 2007/0024580 | A1 | 2/2007 | Sands et al. |
| 2008/0114694 | A1 | 5/2008 | Hamdane et al. |
| 2009/0055383 | A1 | 2/2009 | Zalewski |
| 2010/0293598 | A1 | 11/2010 | Collart et al. |
| 2011/0153586 | A1 | 6/2011 | Wang et al. |
| 2011/0296472 | A1 | 12/2011 | Soldan et al. |
| 2013/0090169 | A1 | 4/2013 | Liu et al. |
| 2013/0236155 | A1 | 9/2013 | Liu et al. |
| 2014/0032304 | A1 | 1/2014 | Kent |

FOREIGN PATENT DOCUMENTS

| | | |
|---|---|---|
| CN | 103475930 A | 12/2013 |
| CN | 103853727 A | 6/2014 |
| EP | 2 028 659 A2 | 2/2009 |
| EP | 2 028 659 A3 | 5/2009 |
| JP | 2009-111972 A | 5/2009 |
| JP | 2013-534743 A | 9/2013 |
| JP | 2015501477 A | 1/2015 |
| WO | WO 2008/112497 A1 | 9/2008 |
| WO | WO 2013-055835 | 4/2013 |
| WO | WO 2014/036568 A1 | 3/2014 |

OTHER PUBLICATIONS

PCT International Search Report and Written Opinion dated Dec. 30, 2015, issued in corresponding International Application No. PCT/US2015/51913 (12 pages).
First Search Report issued in corresponding Chinese Application No. 2014105096975, dated Jan. 24, 2018 (2 pgs.).
Supplemental Search Report issued in corresponding Chinese Application No. 2014105096975, dated Aug. 27 24, 2018 (2 pgs.).
First Office Action issued from The State Intellectual Property Office of People's Republic of China, in corresponding Chinese Application No. 201410509697.5, dated Feb. 1, 2018 (42 pgs.).
Second Office Action issued from The State Intellectual Property Office of People's Republic of China, in corresponding Chinese Application No. 201410509697.5, dated Sep. 4, 2018 (37 pgs.).
Office Action dated Feb. 4, 2019, from Japanese Patent Office, in Japanese Application No. 2017-515713.
Third Office Action issued from The State Intellectual Property Office of People's Republic of China, in corresponding Chinese Application No. 201410509697.5, dated Jul. 1, 2019 (53 pgs.).
Fourth Office Action issued from The State Intellectual Property Office of People's Republic of China, in corresponding Chinese Application No. 201410509697.5, dated Nov. 15, 2018 (40 pgs.).
Japanese Search Report issued in corresponding Japanese Application No. 2017-515713 dated Jan. 23, 2019 (21 pages).

METHOD AND APPARATUS FOR PROVIDING INFORMATION ASSOCIATED WITH MEDIA CONTENT

CROSS-REFERENCE TO RELATED APPLICATION

This application is a continuation of U.S. patent application Ser. No. 16/421,428, filed on May 23, 2019, which is a continuation of U.S. patent application Ser. No. 14/864,308, filed on Sep. 24, 2015, now U.S. Pat. No. 10,306,300, which is based upon and claims priority to Chinese Patent Application No. 201410509697.5, filed on Sep. 28, 2014, the above disclosures of which are incorporated herein by reference in their entireties.

TECHNICAL FIELD

The present application relates to the field of media content processing, and in particular, to a method and an apparatus for providing information associated with media content.

BACKGROUND

In this information age, there are many ways for people to acquire information. For example, large-screen playing devices can be found everywhere in public places such as department store, brand store, subway, and airport. Large volume of multi-media content is displayed on those devices. When a user sees the media content being displayed on the large screen playing devices, the user may want to acquire more information associated with the media content being displayed.

As an illustrative example, a consumer at a subway station sees that a large screen is playing a video of a product, and is interested in the product. The consumer may want to acquire more information about the product. Typically, the consumer can log into the network by using a portable device (e.g., a mobile phone) to search for the product using keywords. The search will generate a voluminous set of data, and the consumer will have to sift through the data to find the information that is relevant to the product. While an advertisement-to-sale conversion may occur, the conversion process (including the search and post-processing of the search result) is inefficient, resulting in lower advertisement-to-sale ratio. Moreover, such a process of acquiring information can require complicated operation by a user, while also taking up huge amount of network resources.

In order to provide information in a more efficient manner, a commonly-used technique in the prior art is insertion of a two-dimensional code in an image picture being displayed on the large screen. A viewer can then scan the two-dimensional code with an App installed in a portable terminal, to acquire additional information about the image being currently displayed.

While this technique is convenient for gathering information, it has a number of short-comings. First, implanting a two-dimensional code picture in an image affects the completeness of the image, which affects its aesthetic appearance as well as a quality of the video displaying of the image. Moreover, scanning a two-dimensional code requires a long time and comes with a risk of, for example, the two-dimensional code disappearing in the video display before the scanning is completed. Further, for accurate scanning, the portal terminal (installed with the App for scanning the code) needs to be aimed at a two-dimensional code zone. It is difficult to maintain the scanning accuracy among multiple users, who can be scanning at different angles and from different distances. Moreover, for a public large screen, the user is typically located at a long a distance from the screen, making it even more difficult to acquire the two-dimensional code information accurately and efficiently.

Therefore, there is a need for a technique to provide information associated with media content being displayed on a display screen, which enables a user to acquire the information more efficiently and accurately.

SUMMARY

The present disclosure provides a computer-implemented method for providing information associated with media contents. The method comprises: broadcasting a communication address associated with a playing device configured to play the media contents, the broadcasted communication address enables a user terminal device to communicate with the playing device; receiving, from the user terminal device, a request to acquire information associated with the media contents; determining an identifier associated with the information; and transmitting the identifier to the user terminal device. The identifier enables the user terminal device to acquire the information.

In some embodiments, the identifier includes a network address associated with a location that stores the information.

In some embodiments, the identifier is associated with a network address associated with a location that stores the information. The identifier enables the user terminal device to acquire the network address.

In some embodiments, the identifier is associated with a name of a file that stores one of the media contents; wherein determining an identifier associated with the information comprises: acquiring the name of the file; and determining the identifier based on the acquired name of the file.

In some embodiments, the identifier includes a first sub-identifier and a second sub-identifier, the first sub-identifier being associated with a name of a file that stores the media contents, and a second sub-identifier being associated with a playing period of one of the media contents; wherein the network address is associated with the first and second sub-identifiers. The determining of an identifier associated with the information comprises: acquiring the name of the file; determining a playing time period according to a progress of playing the file; and determining the first and second sub-identifiers based on the acquired name and the determined playing time period.

In some embodiments, the user terminal device and the playing device communicate via an unauthenticated wireless connection.

Embodiments of the present disclosure also provide a computer-implemented method for acquiring information associated with media content. The method comprises: determining, from a broadcast message, a communication address of a playing device configured to play the media content; transmitting a request to acquire information associated with the media content to the determined communication address; receiving an identifier associated with the media content; and acquiring the information based on the identifier.

Embodiments of the present disclosure also provide a computer-implemented method for associating identifiers with media contents. The method comprises: acquiring a listing of media contents from a playing device configured to play the media contents; and determining, based on the listing, a mapping table that associates identifiers with the media contents, the identifiers being generated to identify information associated with the media contents. The mapping table enables the playing device to provide an identifier in response to a request for information associated with one of the media contents, while the identifier provided by the playing device enables acquiring the information associated with one of the media contents.

In some embodiments, the method further comprises acquiring one or more network addresses of locations that store the information associated with the media contents; associating the identifiers with the one or more network addresses; and providing one of the network addresses in response to receiving a request that includes one of the identifiers. The providing of the one of the network addresses enables acquiring the information associated with one of the media contents.

In some embodiments, each of the identifiers is generated for each of the media contents in the listing.

In some embodiments, the one of the network addresses is provided via an authenticated wireless connection.

Embodiments of the present disclosure also provide an apparatus for providing information associated with media contents, the apparatus comprising a processor being configured to: broadcast a communication address associated with a playing device configured to play the media contents, the broadcasted communication address enables a user terminal device to communicate with the playing device; receive, from the user terminal device, a request to acquire information associated with the media contents; determine an identifier associated with the information; and transmit the identifier to the user terminal device. The identifier enables the user terminal device to acquire the information.

In some embodiments, the identifier is associated with a name of a file that stores one of the media contents; wherein determining an identifier associated with the information comprises the processor being configured to: acquire the name of the file; and determine the identifier based on the acquired name of the file.

In some embodiments, the identifier includes a first sub-identifier and a second sub-identifier, the first sub-identifier being associated with a name of a file that stores the media contents, and a second sub-identifier being associated with a playing period of one of the media contents; wherein the network address is associated with the first and second sub-identifiers; wherein determining an identifier associated with the information comprises the processor being configured to: acquire the name of the file; determine a playing time period according to a progress of playing the file; and determine the first and second sub-identifiers based on the acquired name and the determined playing time period.

Embodiments of the present disclosure also provide an apparatus for acquiring information associated with media content, the apparatus comprising the processor being configured to: determine, from a broadcast message, a communication address of a playing device configured to play the media content; transmit a request to acquire information associated with the media content to the determined communication address; receive an identifier associated with the media content; and acquire the information based on the identifier.

Embodiments of the present disclosure also provide an apparatus for associating identifiers with media contents, the apparatus comprising a processor being configured to: acquire a listing of media contents from a playing device configured to play the media contents; and determine, based on the listing, a mapping table that associates identifiers with the media contents, the identifiers being generated to identify information associated with the media contents. The mapping table enables the playing device to provide an identifier in response to a request for information associated with one of the media contents, while the identifier provided by the playing device enables acquiring the information associated with one of the media contents.

In some embodiments, the processor is further configured to: acquire one or more network addresses of locations that store the information associated with the media contents; associate the identifiers with the one or more network addresses; and provide one of the network addresses in response to receiving a request that includes one of the identifiers. The providing of the one of the network addresses enables acquiring the information associated with one of the media contents.

Additional objects and advantages of the disclosed embodiments will be set forth in part in the following description, and in part will be apparent from the description, or may be learned by practice of the embodiments. The objects and advantages of the disclosed embodiments may be realized and attained by the elements and combinations set forth in the claims.

It is to be understood that both the foregoing general description and the following detailed description are exemplary and explanatory only and are not restrictive of the disclosed embodiments, as claimed.

DESCRIPTION OF THE EMBODIMENTS

Figure 1:
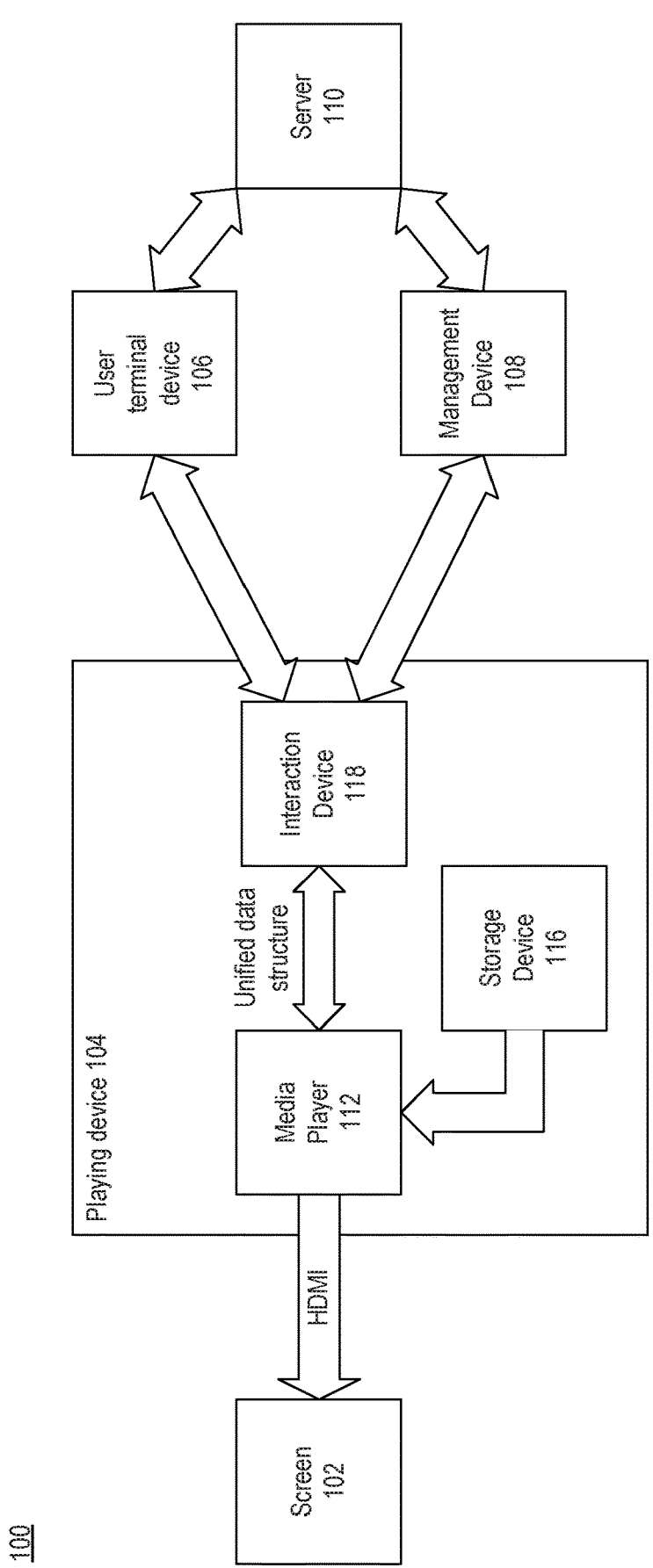
FIG. 1 is a block diagram of an exemplary system for displaying media content and providing information associated with the media content being displayed, consistent with embodiments of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

The present disclosure provides systems and a method for providing information associated with media contents. An apparatus can broadcast a communication address associated with a playing device configured to play the media contents. The broadcasted communication address enables a user terminal device to communication with the playing device. After broadcasting the communication address, the apparatus can receive, from the user terminal device, a request to acquire information associated with the media contents. The apparatus can then determine an identifier associated with the information, and transmit the identifier to the user terminal device. The identifier enables the user terminal device to acquire the information. With such an arrangement, a form of "multi-screen interaction" can be provided to enable a user to acquire more information related to media content being displayed on a large screen. With this form of multi-screen interaction, when a certain program is being displayed on a large-screen device, a portable device can be used to perform interaction with the information being displayed on the large-screen device. The portable device can be a tablet computer, a smart phone, a wearable device (such as a smart watch), or the like. For example, when a program, a movie, music or a video game being played on a large screen (e.g., a television), information related to the content being displayed can be synchronously displayed on the portable device.

Typically, a display device (e.g., a smart TV) may be communicatively coupled with a portable device (e.g., a smart phone) through a local area network, to implement multi-screen interaction. The local area network can be implemented through WiFi. The smart TV and the smart phone can perform mutual transmission of data based on a communication protocol of sharing multi-media data between heterogeneous devices in a local area network, to implement multi-screen interaction between the smart TV and the smart phone. The specific communication protocol can include, for example, Digital Living Network Alliance (DLNA), Apple™ Airplay™, and the like. This form of multi-screen interaction typically involves transferring a video being viewed on the smart phone to the TV for continued viewing, and the like.

Large-screen playing devices mounted at a public place (e.g., subway station, airport, department store, etc.) are mostly in an offline state and are not connected to any local area network. The media content being played is mostly stored locally at the playing device (for example, at a USB disk, an SD card, a mobile hard disk, and the like, which then transmit the data to the playing device). Embodiments of the present disclosure provide methods and apparatus that allow multi-screen interaction between an offline display device and another portable terminal, where there is no local area network to connect the display device with the portable terminal.

Embodiments of the present disclosure can be implemented with a playing device such as a video rod, a media box, a personal computer (PC), a smart TV, and the like. Embodiments of the present disclosure enable displaying of different (but related) information between the screen connected to the play device and at the portable terminal. As an illustrative example, while the playing device is displaying an advertisement of a certain product or a service, the playing device (or an apparatus coupled with it) can also provide information associated with the advertisement to a user terminal device, such as sales and prices of the product or the service, an e-commerce platform that sells the product or the service, etc., which can be acquired and displayed at the user terminal device.

FIG. 1 is a block diagram of an exemplary system 100 for displaying media content, and providing information associated with the media content being displayed, consistent with embodiments of the present disclosure. System 100 includes a display screen 102, a playing device 104, a user terminal device 106, a management device 108, and a server 110.

In some embodiments, playing device 104 comprise a media player 112, a storage device 116, and an interaction device 118. An offline media file, which can be in the format of a video, audio, Flash, a picture, and the like, can be stored in storage device 116. Playing device 104 further includes media player 112, which is configured to generate a media stream and to transmit the media stream to display screen 102 through an HDMI interface, enabling display screen 102 to display the media data as a first screen. In some embodiments, playing device 104 can be a HDMI dongle device.

Interaction device 118 is configured to perform interaction with user terminal device 106. For example, interaction device 118 can include a wireless communication module and the like, and can broadcast periodically a communication address. When media player 112 is playing the media file, upon receiving a request from user terminal device 106, playing device 104 may push, through interaction device 118, identification information configured to identify information associated with media content included in the media file. As an illustrative example, user terminal device 106 may detect a certain operation, such as a touch screen operation, or a shaking action of the terminal device. User terminal device 106 can then transmit a request to play device 104 to acquire an identifier of information associated with the media content. Based on the identifier, user terminal device 106 can acquire the information. Moreover, based on the identifier, the association information concerned by the user may be opened on a screen of the terminal device, which acts as the second screen. Management device 108 enables a system administrator to configure or update the identifier information as required.

In some embodiments, interaction device 118 can be implemented with a low-power consumption wireless communication module. Such a module can be compatible with one or more Bluetooth protocols, such as Bluetooth Low Energy (BLE) (e.g., BLE4.0), conventional Bluetooth function (BT3.0/2.x), or both. As for user terminal device 106, most terminal devices can support the conventional Bluetooth wireless protocol. In addition, there is an increasing number of terminal devices that are provided with BLE. For example, iPhone4S and higher versions, and terminal devices installed with Android 4.3 or higher versions, are generally provided with BLE. Therefore, the playing device and the user terminal device can perform interaction through the BLE protocol.

As to be described below, the aforementioned multi-screen interaction includes interaction between playing device 104 and user terminal device 106. In some embodiments, the aforementioned multi-screen interaction also includes interactions between server 110 and user terminal device 106. Server 110 can also be configured to interact with management device 108 and playing device 104 to configure or to update the information associated with the media content being played. In some embodiments, at least parts of server 110 and management device 108 can be integrated together as a single device. In some embodiments, at least parts of management device 108 and playing device 104 can also be integrated together as a single device.

Figure 2:
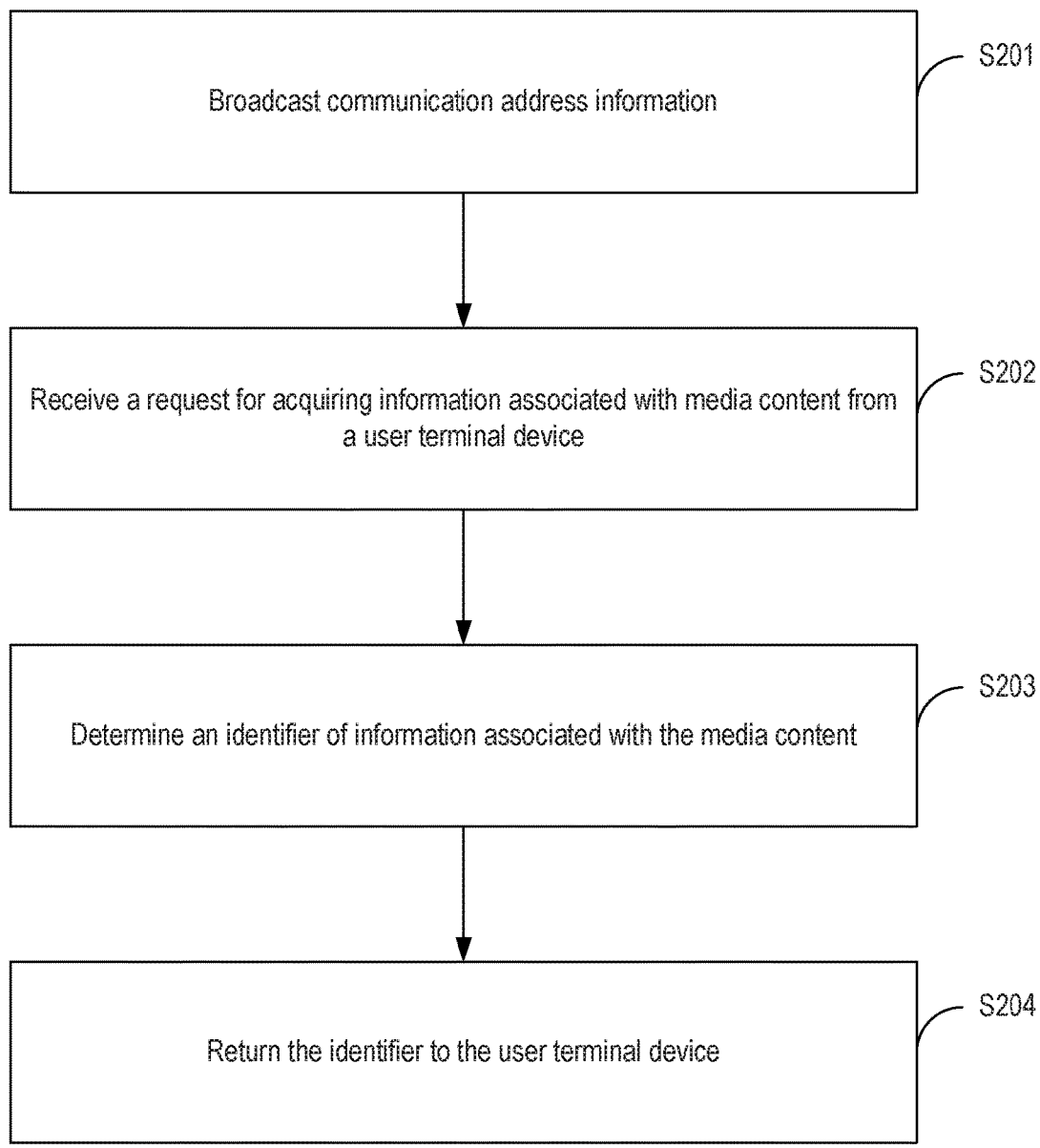
FIG. 2 is a flow chart of an exemplary method for providing information associated with media content, consistent with embodiments of the present disclosure.

FIG. 2 is a flow chart of an exemplary method 200 for providing information associated with media content, consistent with embodiments of the present disclosure. In some embodiments, exemplary method 200 can be performed by playing device 104 of FIG. 1 (or an apparatus with access to it). The playing device also includes a wireless communication module (e.g., included in interaction device 118), and stores a mapping table (e.g., at storage device 116) that includes a plurality of identifiers of information associated with media content. Details about the mapping table are to be described below. Method 200 comprises the following steps:

In step S201, playing device 104 broadcasts communication address information associated with the wireless communication module, which enables a terminal device with corresponding wireless communication module (e.g., user terminal device 106) to receive information transmitted by the playing device.

Multi-screen interaction can be implemented when both the playing device and the user terminal device include conventional wireless communication modules. The wireless communication module can be implemented with different wireless standards. For example, the wireless communication module can be a conventional Bluetooth module. In that case, the devices need to be paired before a connection is established between them. To trigger the pairing process, the user terminal device can first search for other wireless communications devices. From the list of discovered wireless communications devices, a user can select, via the user terminal device, a playing device that is playing certain media content viewed by the user, and its associated information. Such information can include a name associated with the playing device and can be broadcasted by the playing device. A playing device can then be selected for pairing based on its name. In some cases, a client-side application installed in the user terminal device can also automatically trigger the process of searching for a playing device by searching for other Bluetooth devices. For example, the application can detect, through a positioning system, that the user is currently located at a certain public place. From the information stored at a pre-established database, the application can determine a list of playing devices located in that public place. A playing device that meets certain criteria (e.g., matching a pre-stored playing device name) can be selected from the list for the matching. After the pairing succeeds, the two devices (the user terminal device and a playing device) exchange their communication addresses (e.g., MAC addresses) to establish a communication connection. In this case, upon receiving an instruction to acquire information associated with the media content, the client application of the user terminal device can wirelessly transmit a request for the information to the wireless communication module of the paired playing device.

In some cases, the pairing process can affect the efficiency of acquisition of the information. For example, the pairing can introduce delay in the acquisition of the requested information. Moreover, in a crowded place, a large number of Bluetooth devices (including the user terminal devices) can be discovered in the search process, making it difficult to select the playing device, among the user terminal devices, that is playing the media content being viewed and inquired by the user. Furthermore, conventional Bluetooth devices can have large number of channels (e.g. dozens). Therefore, during searching and pairing of the user terminal device and the playing device, both the user terminal device and the playing device may perform frequency hopping continuously, making it difficult for each party to discover the other party.

In some embodiments, to mitigate the aforementioned defects, the wireless communication between the playing device and the user terminal device can be implemented according to the BLE (e.g., BLE 4.0) protocol. BLE can provide at least the following advantages: First, BLE devices do not require authenticated connection between them, that is, a pairing process similar to that of conventional Bluetooth is not required. Therefore, the delay in the acquisition of the requested information can be reduced. Second, BLE provides a broadcasting capability, which enables the playing device to broadcast its communication address information (such as, a MAC address) between a certain interval (for example, every 100 ms). If the user terminal device also includes the BLE function, it can acquire the communication address through listening to the broadcasting. The user terminal device can then communicate directly with the playing device without performing the pairing process. The user terminal device also needs not differentiate between the playing devices and other user terminal devices, if these user terminal devices do not broadcast. Multiple user terminal devices can acquire the communication address associated with the broadcasting wireless communication module (in the playing device) simultaneously, or within a very small time interval, and establish a connection with it. Therefore, the efficiency for acquiring information associated with media content can be further improved.

In step S202, the playing device receives a request from the terminal device for acquiring information associated with the media content being currently played in the playing device.

According to embodiments of the present disclosure, the playing device includes a wireless communication module. Therefore, if the user terminal device also includes wireless communication capability, the two devices can perform multi-screen interaction. Accordingly, to acquire information associated with media content being played in a certain playing device, the user terminal device can send a request for the information to the playing device wirelessly.

In some embodiments, a client application on the user terminal device, upon receiving information broadcasted by a target playing device, can prompt the user to acquire information associated with the media content in the playing device. The client application can then detect an acquisition instruction from the users. Different types of interfaces can be provided to the user to input an instruction. For example, controls such as buttons can be provided on a user interface, and the user terminal device can send the request after detecting an operation of the control. In some embodiments, the user terminal device can include sensor devices, such as an acceleration sensor and a light sensor, configured to detect a specific event pre-determined to represent an instruction from the user to send the request. For example, the user terminal device can prompt the user to send an operation instruction in the manner of "shake it." The acceleration sensor in the terminal device can then detect a shaking action. Upon detecting the shaking action, the user terminal device can send a request of acquiring information associated with the media content being currently played to the target playing device.

In step S203, the playing device determines, according to a mapping table, an identifier of information associated with the media content being currently played.

After receiving the request from the user terminal device, the playing device can first determine the media content being currently played. The play device can then determine, according to a pre-established mapping table, an identifier of information associated with the media content being currently played.

The mapping table can be pre-stored in the playing device, and can associate various kinds of identifiers with the information associated with the media content. In some embodiments, the identifier includes a name of the information. The name enables the user terminal device to search with a pre-configured search engine, using the name as keyword. The search can then yield more details about the information. In some embodiments, the identifier includes a network address, such as a Uniform Resource Locator (URL), of a location that stores the associated information. The URL enables the user terminal device to retrieve more details about the information.

In some cases, the URL string needs to be transmitted in portions. This is because some wireless communication protocols (e.g., BLE 4.0) limit the maximum size of packets being transmitted (e.g., no more than 30 bytes), while the length of URL strings for the associated information typically exceeds the size limit (e.g., a URL for a product detail page at an e-commerce platform). In this case, the URL can be divided into a plurality of portions, with each portion of the URL being associated with an identifier. The portions can then be transmitted with multiple packets to the user terminal device. However, the division of the URL can add delay to the acquisition of the information. Moreover, when responding to requests from multiple clients simultaneously, various problems such as congestion and transmission errors can occur.

In some embodiments, the information can be associated with a predetermined identifier. The association between the information and the predetermined identifier can be stored in the mapping table. The length of the predetermined identifier can be controlled to between 8 bytes and 16 bytes, allowing the identifier to be transmitted in a single packet without requiring division. In some embodiments, a server (e.g., server 110 of FIG. 1) can store a second mapping table that associates the predetermined identifier with a network address through which the information can be accessed. The second mapping table can be stored at the server. After the user terminal device acquires the identifier from the playing device, the user terminal device can transmit a second request to the server, with the second request including the identifier. The server can then access the second mapping table with the identifier, and provide the network address associated with the identifier to the user terminal device. The user terminal device can then acquire the details of the information using the using the network address.

The use of predetermined identifier can also mitigate the risk of hacking. In particular, since BLE 4.0 does not require pairing, the content of messages transmitted under the BLE 4.0 protocol can be intercepted and tempered while en route to the user terminal device. For example, if the playing device transmits a network address to the user terminal device using BLE 4.0, a hacker can temper the transmitted address to redirect the user terminal device to another network address. On the other hand, without changing the mapping between the identifier and the associated information location (as stored at the server), the hacker cannot temper the identifier to redirect the user terminal device to a different network location. Such an arrangement can enhance the security of the multi-screen interaction.

Media content is typically stored in the form of media files. In some cases, each media file can store the data for a specific piece of media content. For example, an Audio Video Interleave (AVI) file can store data for an advertisement of a certain product. The mapping table stored at the playing device can store a mapping between the identifier and the name of a media file. Accordingly, in step S203, the playing device can determine a name of the media file being currently played, and then determine the identifier associated with the name of the media file according to the mapping table.

In some embodiments, one media file can store multiple pieces of media content. For example, an AVI file can store data for the advertisements of multiple products and/or services, with each product or service being associated with a piece of media content. In this case, each piece of media content included in the file can be marked with timestamps. The timestamps can be configured to represent a playing time period of the piece of media content when the file is played. The identifier can also include a first sub-identifier that is associated with the file, and a second sub-identifier that is associated with a piece of the media content. The mapping table stored at the playing device can then provide the associations among the name of a file that stores a piece of media content, the playing time period of the piece of media content, and the first and second sub-identifiers. Moreover, the second mapping table stored at the server can also provide the associations among the first and second sub-identifier, and the network addresses of the locations that store information associated with the piece of media content. Accordingly, in step S203, the playing device can determine a name of a currently-played media file and, based on a progress of playing the file, determine a current playing time period of the file. The playing device can then determine, from the mapping table, the first and second sub-identifiers, based on the name of the media file and the playing time period. The playing device can then transmit the first and second sub-identifiers to the user terminal device, which can then acquire, from the server, a network address associated with the first and second sub-identifiers. The network address enables the user terminal device to acquire the information associated with the portion of the currently-played media file.

The mapping table at the playing device can be created in different ways. In some embodiments, the mapping table is manually created and updated by an administrator. In some embodiments, to improve the efficiency, a management device (e.g., management device 108 of FIG. 1) is provided to facilitate the generation of the mapping table. For example, in a situation where a name or a network address is used as an identifier, the management device can provide a list of media contents to be played (or being played) by the playing device. The list can be acquired from, for example, the playing device, or from other sources. A mapping table can then be created to associate each of the listed media contents with the name and/or network address of the information associated with the media content. The management device can then transmit the mapping table back to the playing device for storage.

In some embodiments, in a situation wherein the predetermined identifiers are used, the server is configured to also create the identifiers. Such an arrangement can avoid a scenario where different management devices create conflicting associations between the identifiers and the media content (e.g., different management devices create the same identifier for different media content). Such conflicts can create confusion at the server which stores, with the second mapping table, the association between the identifiers and the information associated with the media content.

In some embodiments, after determining a list of media contents in the playing device, the management device can send the list of media contents to the server. The server can then generate an identifier for each of the listed media contents, and returns the identifier information back to the management device. Based on the identifier information from the server, the management device can then confirm that the identifiers are associated with the information associated with the listed media contents. The management device can then create the mapping table, and provide the mapping table to the playing device for storage. In some embodiments, the management device can also receive a network address for the information associated with the listed media contents, and provide the network address to the server. This enables the server to store an association between the identifiers and the network addresses in the second mapping table.

In some embodiments, where one media file stores one piece of media content, the list of the media content can be a list of media file names, the process of generating the mapping table comprises:

In Step S203a1, a management device (e.g., management device 108 of FIG. 1) sends, to a playing device (e.g. playing device 104 of FIG. 1), a request to acquire a media file list in the playing device. An example of the file list is shown in Table 1:

TABLE 1

| Number | Media File Name |
|--------|-----------------|
| 1      | 123.AVI         |
| 2      | 234.AVI         |
| ...    | ...             |

In Step S203a2, the management device sends a request to a server (e.g., server 110 of FIG. 1) for identifiers, the request including the media file list. The request enables the server to generate and return an identifier for each of the listed media files. The identifiers can be generated with an algorithm.

In Step S203a3, the management device acquires a URL of information associated with each of the media files. The URL can be designated by an administrator. An association among the media files, the identifiers, and the URLs can be created.

In Step S203a4, the management device creates a first mapping table that associates the media file names and the identifiers, and sends the first mapping table to the playing device. The first mapping table can be stored at the playing device. An example of the first mapping table is shown in Table 2:

TABLE 2

| Number | Media File Mane | ID       |
|--------|-----------------|----------|
| 1      | 123.AVI         | 00000001 |
| 2      | 234.AVI         | 00000002 |
| ...    | ...             | ...      |

In Step S203a5, the management device sends the URLs associated with each of the identifiers to the server, which enables the server to store an association between the identifiers and the URLs, in a second mapping table. An example of the second mapping table is shown in Table 3:

TABLE 3

| Number | ID       | URL  |
|--------|----------|------|
| 1      | 00000001 | URL1 |
| 2      | 00000002 | URL2 |
| ...    | ...      | ...  |

In some embodiments, where one media file stores multiple pieces of media content, the list of media contents acquired from a target playing device can associate a media file name with the time period information corresponding to each of the multiple pieces of media content. As an illustrative example, the playing time period of the first piece of media content can be from 0 S to 30 S, and the playing time period of the second piece of media content is from 31 S to 45 S, and so on. In this case, the process of generating the mapping table may comprise:

In Step 203b1, a management device (e.g., management device 108 of FIG. 1) sends, to a playing device (e.g., playing device 104 of FIG. 1), a request to acquire a media file list in the playing device.

For example, the file list is as that shown in Table 4:

TABLE 4

| Number | Media File Name | Playing Time Period |
|--------|-----------------|---------------------|
| 1      | 123.AVI         | 0 S-30 S            |
|        |                 | 31 S-45 S           |
|        |                 | ...                 |
| 2      | 234.AVI         | 0 S-15 S            |
|        |                 | 16-35 S             |
| ...    | ...             | ...                 |

In Step 203b2, the management device designates, according to the information in the list, an URL of information associated with media content corresponding to each playing time period.

In Step 203b3, the management device replaces the playing time period information in the list with the URLs (or alternatively, associates the URLs with each playing time period in Table 4). The management device then transmits the updated list to the server. The updated list enables the server to generate, with an algorithm, a first sub-identifier for each media file, and a second sub-identifier for each URL. A second mapping table can be created to store the association among the first and second identifiers and the URLs. An example of the second mapping table is shown in Table 5:

TABLE 5

| First sub-identifier | Second sub-identifier | URL |
|---|---|---|
| 00000001 | 10000001 | URL1 |
|  | 10000002 | URL2 |
|  | ... | ... |
| 00000002 | 10000003 | URL3 |
|  | 10000004 | URL4 |
| ... | ... | ... |

In Step 203b4: The server attaches the first and second sub-identifiers into the media file list and returns the updated list back to the management device. The management device can then create the first mapping table to associate the identifiers with the rest of the entries in the mapping table. The first mapping table is then transmitted to the playing device for storage. An example of the first mapping table is shown in Table 6:

TABLE 6

| Number | Media File Name | File Sub-ID | Media content | Information Sub-ID |
|---|---|---|---|---|
| 1 | 123.AVI | 00000001 | 0 S-30 S | 10000001 |
|  |  |  | 31 S-45 S | 10000002 |
|  |  |  | ... | ... |
| 2 | 234.AVI | 00000002 | 0 S-15 S | 10000003 |
|  |  |  | 16-35 S | 10000004 |
| ... | ... | ... | ... | ... |

In some embodiments, the management device can also be used to update the identification information of the association information. For example, the URL associated with a certain piece of media content may have been updated. The management device can synchronize with the server for the updates. Also, the second sub-identifiers associated with the first sub-identifiers can also be updated at the management device. The management device can then synchronize with the playing device and with the server for the updates. Accordingly, a user terminal device can receive an updated second sub-identifier, and use the second sub-identifier to retrieve the associated URL, from which the user terminal device can acquire the associated information for displaying.

In some embodiments, management device can configure the first mapping table at the playing device through either wireless communication or wired communication. When the configuration process is implemented through wireless communication, a conventional Bluetooth protocol can be used, which enables an authenticated connection to be established for the transmission of the configuration data. With an authenticated connection, it becomes difficult to tamper the configuration data (e.g., network locations of the associated information) during transmission; therefore, the security of the configuration operation can be improved. Accordingly, the playing device may be provided with both a BLE module and a conventional Bluetooth module, and the two forming a wireless communication module. The BLE module can be configured to perform multi-screen interaction with the user terminal device, and the conventional Bluetooth module can be configured for the configuration process of the first mapping table at the playing device.

In step S204, the playing device returns the identifier of the associated information through the wireless communication module to the user terminal device. The identifier enables the user terminal device to acquire the associated information.

As described above, after the playing device determines the identifier of the information associated with the media content, the identifier information may be returned to the user terminal device through the wireless communication module. The user terminal device can then acquire the information with the identifier. The information can be, for example, a webpage listing a product at a certain e-commerce transaction platform, and the like. The webpage can include information of interest to a user, such as the price and user comments. If the identifier of the information includes a network address, the user terminal device can acquire the information directly with the network address. If a predetermined identifier is being used, the identifier can be transmitted to the server to acquire the associated network address, which can then be used by the user terminal device to acquire the information.

Accordingly, embodiments of the present disclosure provide a wireless communication module and a mapping table at a playing device, with the mapping table storing identifiers of information associated with media content. The wireless communication module enables the playing device to receive a request, from a user terminal device, for information associated with the media content currently being played by the playing device. The playing device can then determine an identifier of the information according to the mapping table, and return the identifier information through the wireless communication module. The user terminal device can then use the identifier to acquire the information. The wireless communication module enables multi-screen interaction to be performed even if the playing device and the user terminal device are not connected to the same local area network.

Moreover, since the wireless communication module can support broadcasting and does not need an authenticated connection, the playing device can broadcast a communication address associated with the wireless communication module. Accordingly, the multi-screen interaction can be performed without the need of an authenticated connection between the playing device and a user terminal device. This enables the user terminal device to acquire the information associated with the media content in a more efficient manner. The multi-screen interaction, implemented with the broadcasting wireless scheme, can also be adapted for crowded places such as a subway station and an airport.

Figure 3:
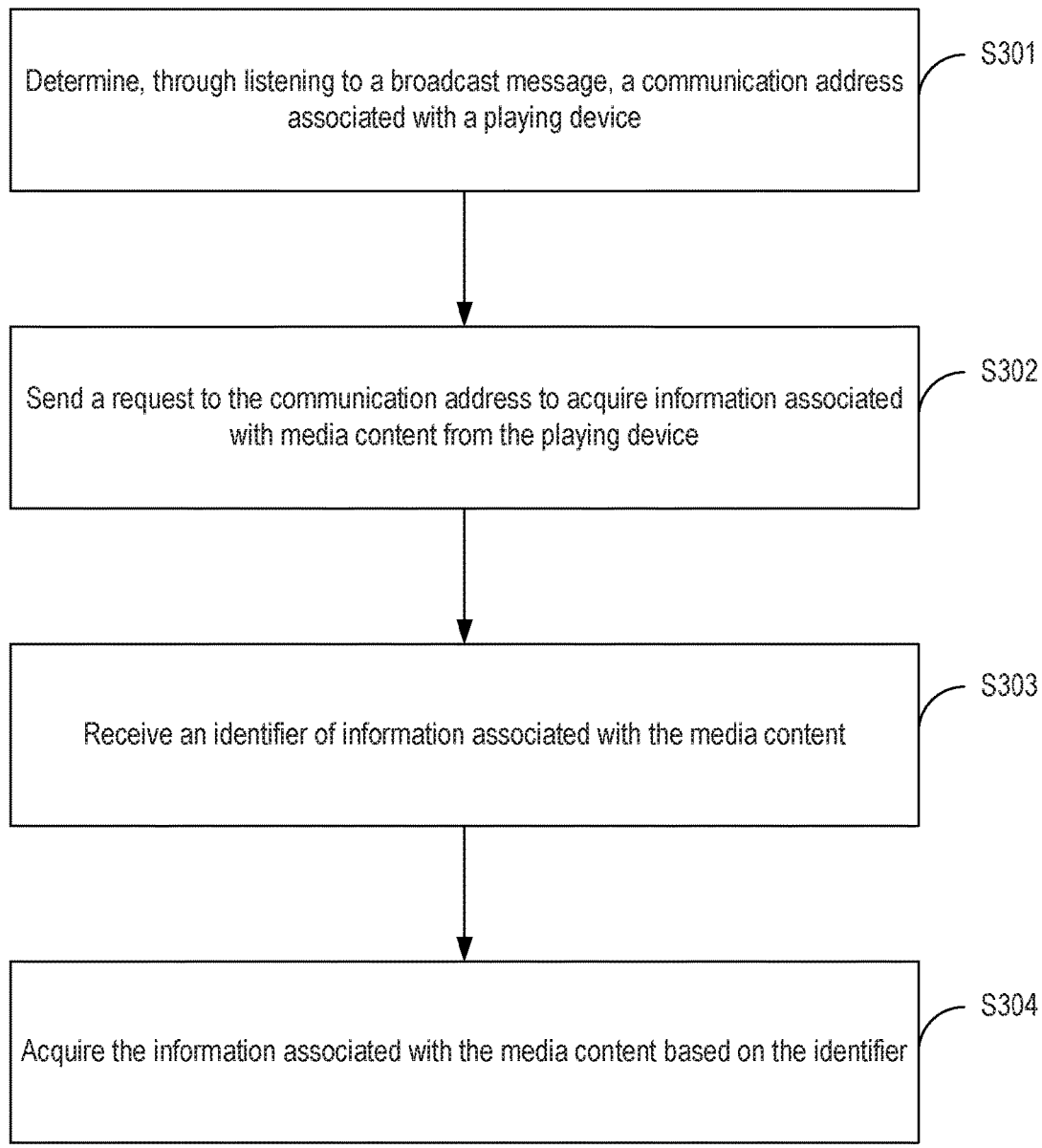
FIG. 3 is a flow chart of an exemplary method for acquiring information associated with media content, consistent with embodiments of the present disclosure.

FIG. 3 is a flow chart of an exemplary method 300 for acquiring information associated with media content, consistent with embodiments of the present disclosure. In some embodiments, exemplary method 300 can be performed by user terminal device 106 of FIG. 1. Method 300 comprises the following steps:

In step S301, user terminal device 106 determines, through listening to a broadcast message, a communication address associated with a playing device (e.g., playing device 104 of FIG. 1) that is playing media content.

In step S302, the user terminal device sends a request to the communication address, to acquire information associated with media content from the playing device.

In some embodiments, the user terminal device can further provide prompt information for the user. The user terminal device can then detect a pre-configured operation from the user. Upon detecting an event of the pre-configured operation, the user terminal device can transmit the request.

In step S303, the user terminal device receives an identifier of information associated with the media content. The identifier is determined according to a mapping table.

Details and functionalities of the mapping table have been described above with respect to Tables 2-4 and are not repeated here.

In step S304, the user terminal device acquires the information associated with the media content based on the identifier.

Figure 4:
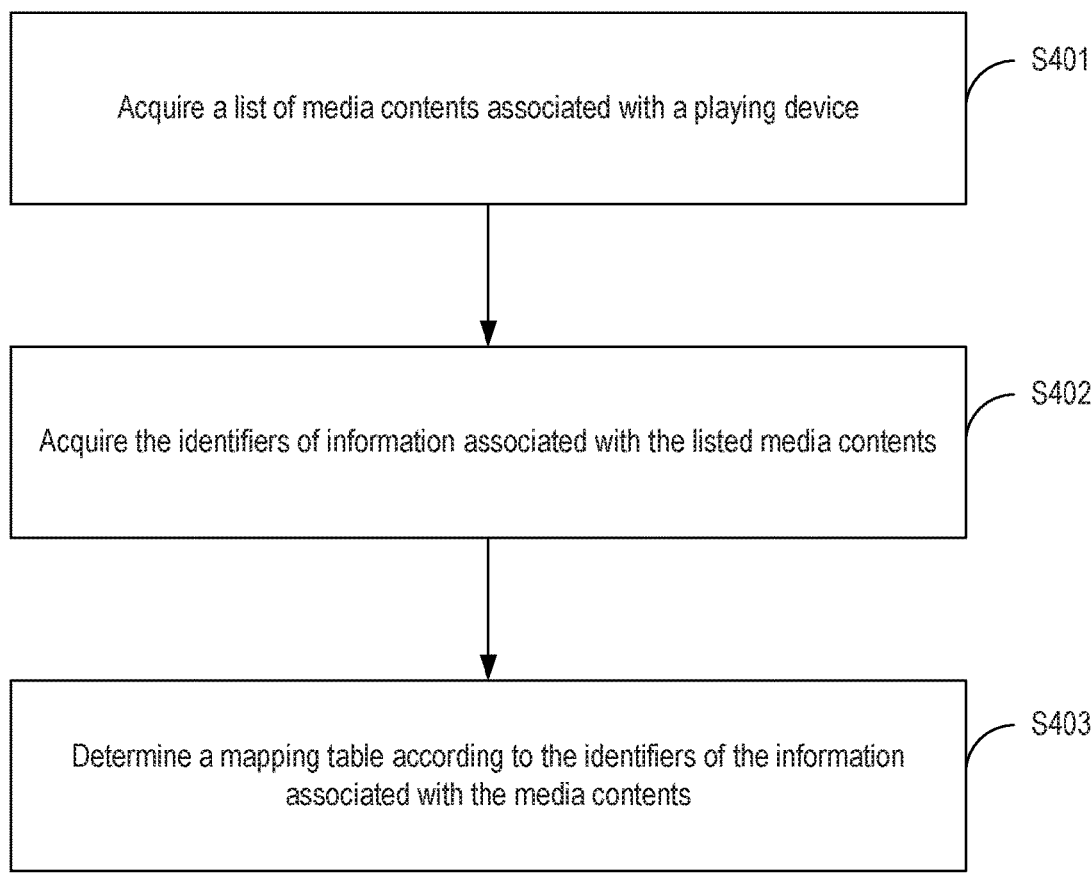
FIG. 4 is a flow chart of an exemplary method for associating media content with identifiers of information associated with the media content, consistent with embodiments of the present disclosure.

FIG. 4 is a flow chart of an exemplary method 400 for associating media content with identifiers of information associated with the media content, consistent with embodiments of the present disclosure. In some embodiments, exemplary method 400 can be performed by management device 108 of FIG. 1. Method 400 comprises the following steps:

In step S401, management device 108 acquires a list of media contents associated with a playing device.

In step S402, the management device acquires the identifiers of the associated with the listed media contents.

In some embodiments, the identifiers can be generated by a server (e.g. server 110 of FIG. 1) for each of the listed media contents. The management device then receives the identifiers and transmits them to the playing device. The identifiers can then be stored at a mapping table at the playing device. The management device also acquires the network addresses of the information associated with each of the listed media contents. The management device then sends the network address information to the server, thereby enabling the server to store the associations between the identifiers and the network addresses. The server can then, upon receiving a request including an identifier from a user terminal device, provide a network address associated with an identifier, thereby enabling the user terminal device to acquire the associated information using the network address. The structures of the mapping tables can be different between a case where the listed media file includes only one piece of media content, and the case where the listed media file includes multiple pieces of media content. The details of the different structures of the mapping tables and identifiers have been described above with respect to Tables 2-4, and their details are not repeated here.

In step S403, management device 108 determines the mapping table (to be stored at the playing device) according to the identifiers of the information associated with the media content. The mapping table enables the playing device to provide an identifier of information associated with the media content being played at the playing device, upon receiving a request from a user terminal device. The user terminal device can then use the identifier to acquire the associated information. The transmission of the mapping table (and the updates) from the management device to the playing device can take place over an authenticated wireless connection.

Figure 5:
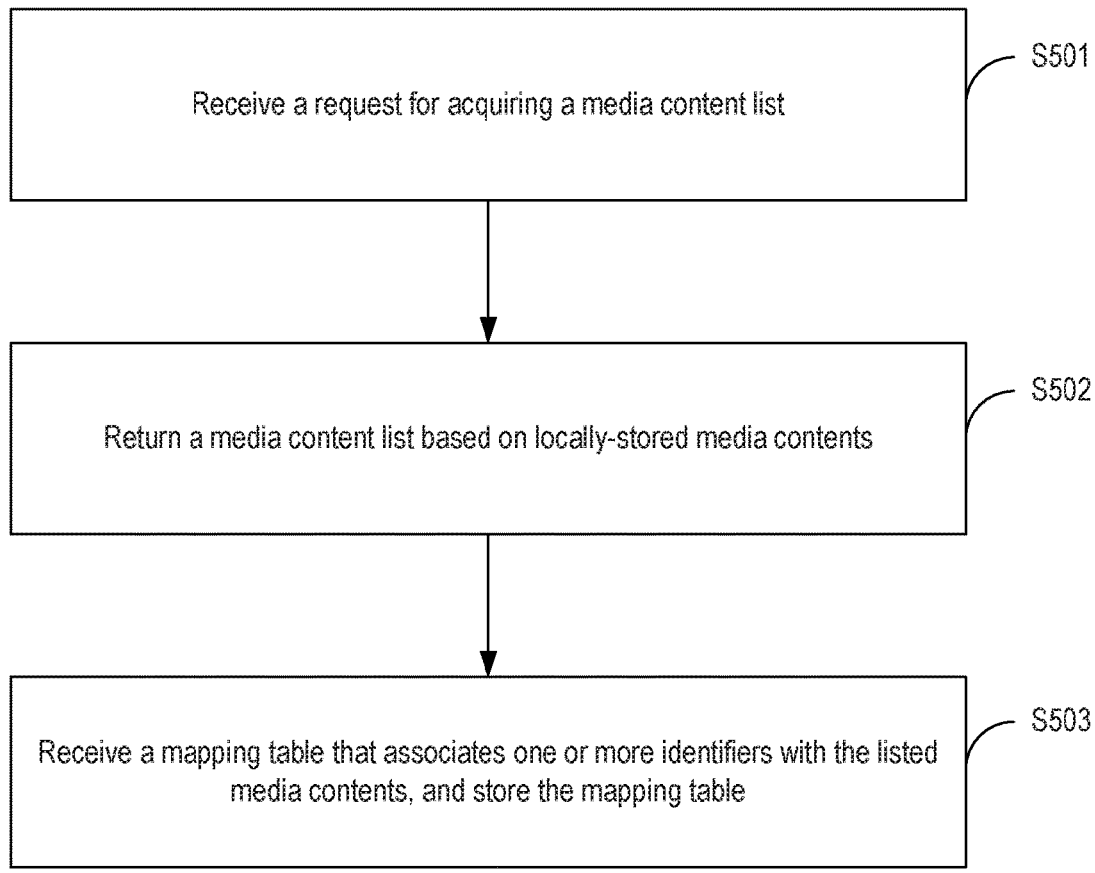
FIG. 5 is a flow chart of an exemplary method for acquiring association information between media content and identifiers of information associated with the media content, consistent with embodiments of the present disclosure.

FIG. 5 is a flow chart of an exemplary method 500 for acquiring association information between media contents and identifiers of information associated with the media contents, consistent with embodiments of the present disclosure. In some embodiments, exemplary method 500 can be performed by playing device 104 of FIG. 1. Method 500 comprises the following steps:

In step S501, playing device 104 receives, from a management device (e.g., management device 108 of FIG. 1), a request for acquiring a media contents list.

In step S502, the playing device returns a media contents list based on locally-stored media contents. The media contents are stored as media files. In a case where each media file stores one piece of media content, the media contents list includes a name of each locally stored media file. In a case where each media file stores multiple pieces of media content, the media contents list further includes the playing time period information of each piece of media content.

In step S503, the playing device receives a mapping table that associates one or more identifiers with the listed media contents, and stores the mapping table. The functionalities of the mapping tables and the identifiers have been described above with respect to FIGS. 2-4 and are not repeated here.

Figure 6:
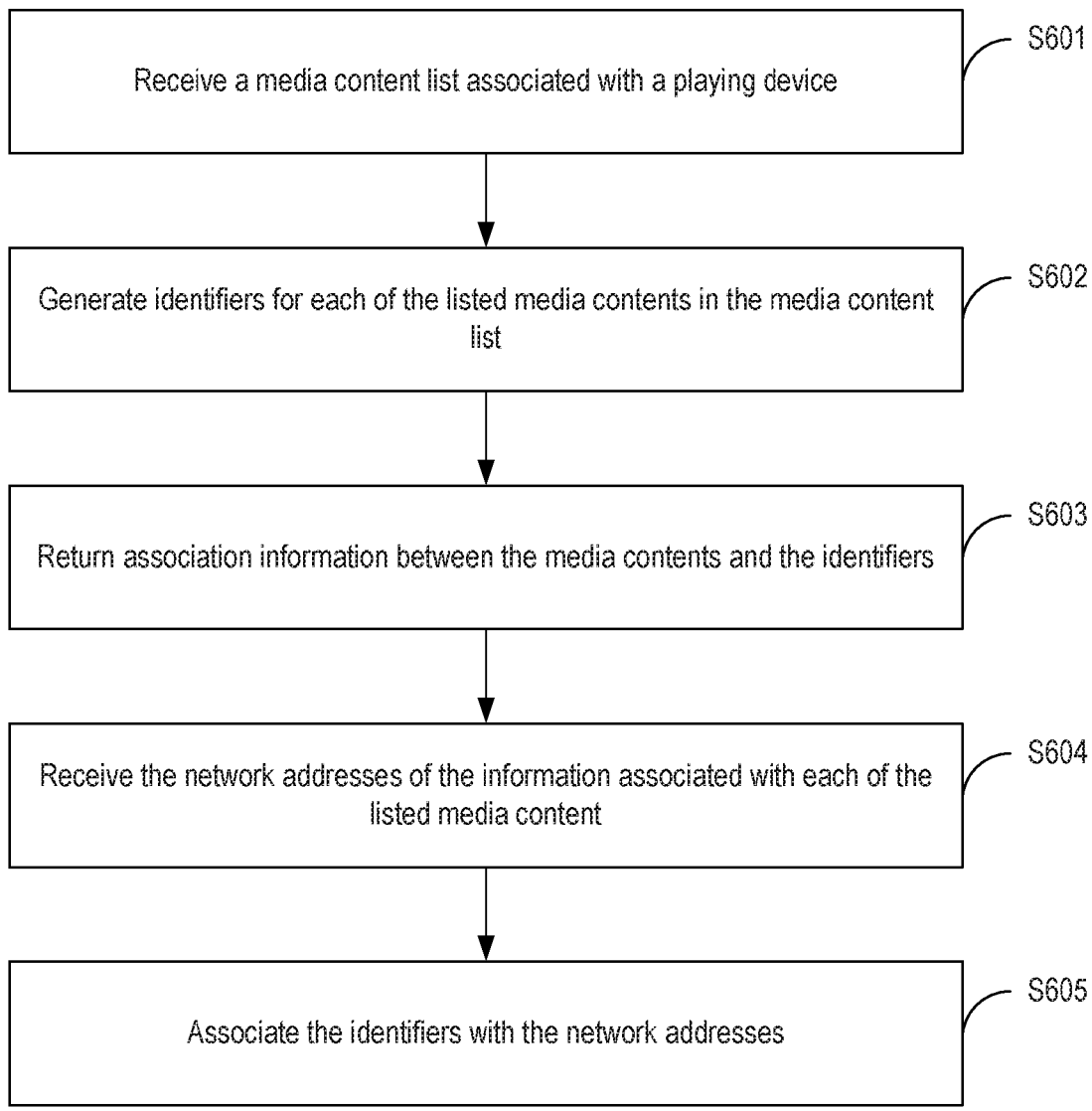
FIG. 6 is a flow chart of an exemplary method for generating association information between identifiers of information and network locations of the information, consistent with embodiments of the present disclosure.

FIG. 6 is a flow chart of an exemplary method 600 for generating association information between identifiers of information and network locations of the information, consistent with embodiments of the present disclosure. In some embodiments, exemplary method 600 can be performed by server 110 of FIG. 1. Method 600 comprises the following steps:

In step S601, server 110 receives, from a management device (e.g., management device 108 of FIG. 1), a media contents list associated with a playing device (e.g., playing device 104).

In step S602, the server generates identifiers for each of the listed media contents in the media contents list.

In step S603, the server returns association information between the media contents and the identifiers to the management device. A first mapping table can then be created according to association information. The first mapping table can be used by the playing device to provide an identifier associated with the media content. Examples and functionalities of the first mapping table have been described with respect to Tables 1-4 and are not repeated here.

In step S604, the server receives, from the management device, the network addresses of the information associated with each of the listed media contents.

In step S605, the server associates the identifiers with the network addresses in a second mapping table. The second mapping table enables the server to provide a network address associated with an identifier included in a request from a user terminal device. Examples and functionalities of the second mapping tables have been described above with respect to Tables 5-6 and are not repeated here.

Figure 7:
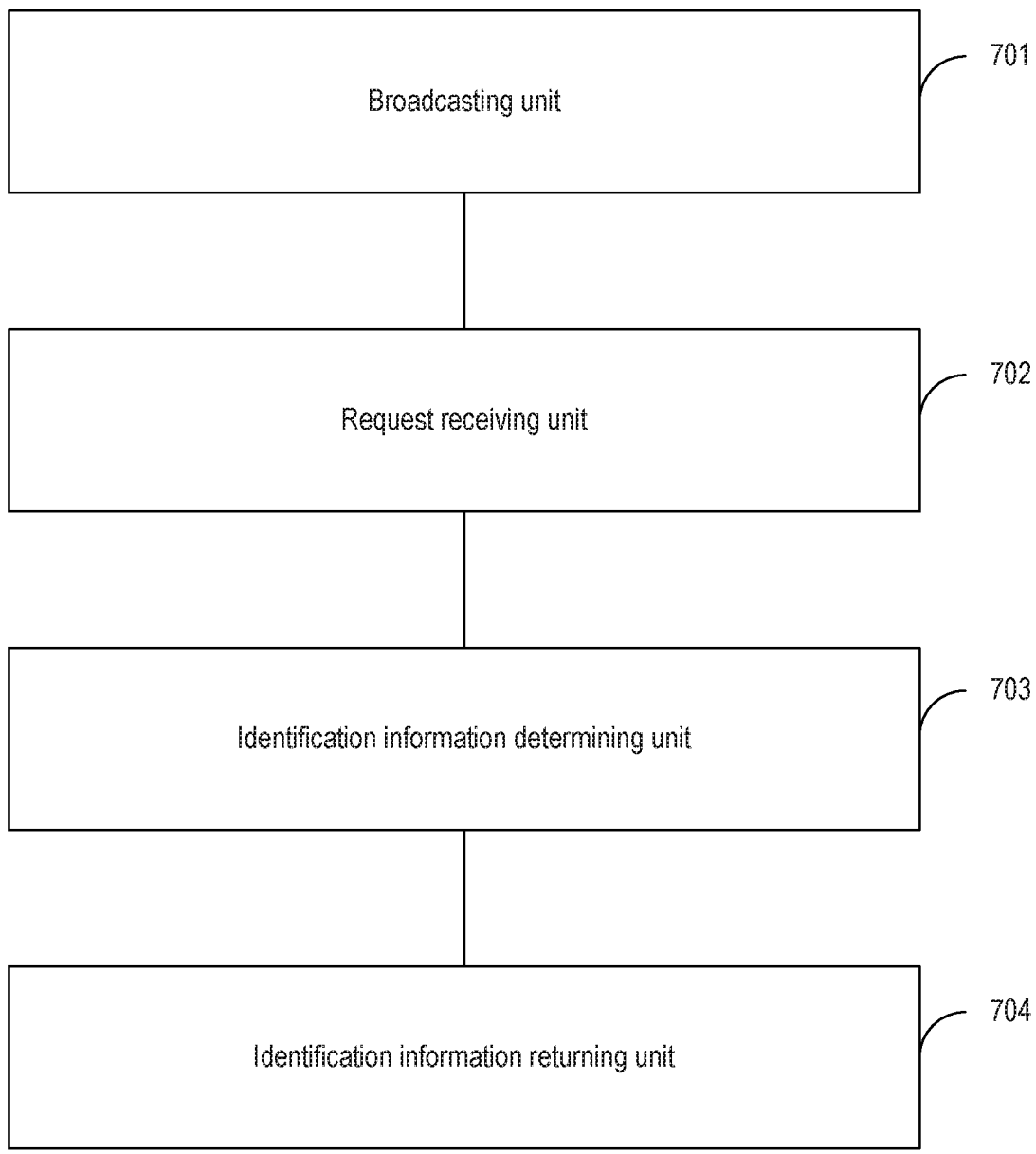
FIG. 7 is a block diagram of an exemplary apparatus for providing information associated with media content, consistent with embodiments of the present disclosure.

FIG. 7 is a block diagram of an exemplary system 700 for providing information associated with media content, consistent with embodiments of the present disclosure. System 700 can be part of a playing device (e.g., playing device 104 of FIG. 1), and is configured to implement part of or the entirety of method 200 of FIG. 2. System 700 (or the media playing device) stores at least one media content and a mapping table that associates the media content with an identifier, with the identifier being configured to identify information associated with the media content. Referring to FIG. 7, system 700 includes a broadcasting unit 701, a request receiving unit 702, an identification information determining unit 703, and an identification information returning unit 704.

Broadcasting unit 701 includes a wireless module and is configured to broadcast wirelessly communication address information associated with the wireless communication module. A user terminal device (e.g., user terminal device 106 of FIG. 1) having a corresponding wireless communication module can receives the communication address information. In some embodiments, the wireless communication module comprises a Bluetooth module that has a broadcast function and does not need an authenticated connection.

Request receiving unit 702 is configured to receive, from the user terminal device, a request to acquire information associated with the media content being currently played in the playing device.

Identification information determining unit 703 is configured to determine, based on the locally-stored mapping table according to the correspondence table, an identifier of information associated with the media content being currently played at the playing device. In some embodiments, identification information determining unit 703 is configured to implement part of or the entirety of step S203 of method 200. The identifier can include a network address of a location that stores the information associated with the media content. The identifier can also be a pre-determined identifier associated with the media content. In the case where the media files stored at the playing device includes a plurality of media contents, the identifier can include a first sub-identifier associated with the media files and a second sub-identifier associated with the media contents.

Identification information returning unit 704 is configured to return the identifier determined by identification information determining unit 703, via the wireless communication module. The identifier enables the user terminal device to acquire the information associated with the media content being played at the playing device.

Figure 8:
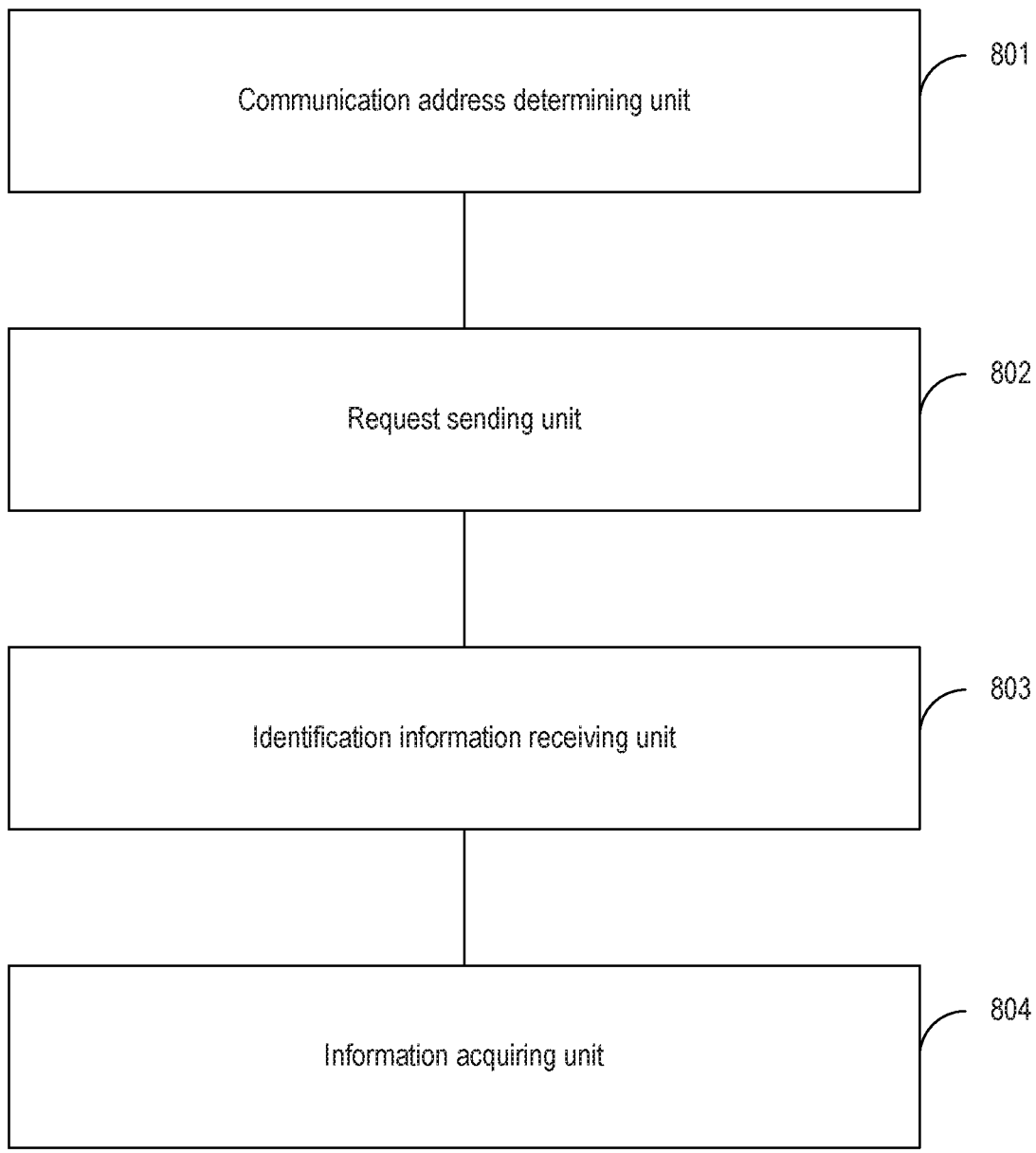
FIG. 8 is a block diagram of an exemplary apparatus for acquiring information associated with media content, consistent with embodiments of the present disclosure.

FIG. 8 is a block diagram of an exemplary system 800 for acquiring information associated with media content, consistent with embodiments of the present disclosure. System 800 can be part of a user terminal device (e.g., user terminal device 106 of FIG. 1), and is configured to implement part of or entirety of method 300 of FIG. 3. System 800 includes a wireless communication module. Referring to FIG. 8, system 800 includes a communication address determining unit 801, a request sending unit 802, an identification information receiving unit 803, and an information acquiring unit 804.

Communication address determining unit 801 is configured to determine, through listening to a broadcast message, a communication address associated with a playing device (e.g., playing device 104 of FIG. 1) that is playing media content.

Request sending unit 802 is configured to send, through the wireless communication module to the playing device, a request to acquire information associated with the media content. The media content can be played currently at the playing device and viewed by a user operating the user terminal device.

Identification information receiving unit 803 is configured to receive an identifier of information associated with the media content. The identifier is determined by the playing device according to a mapping table (e.g., Tables 2-4 as described above).

Information acquiring unit 804 is configured to acquire the information based on the identifier.

Figure 9:
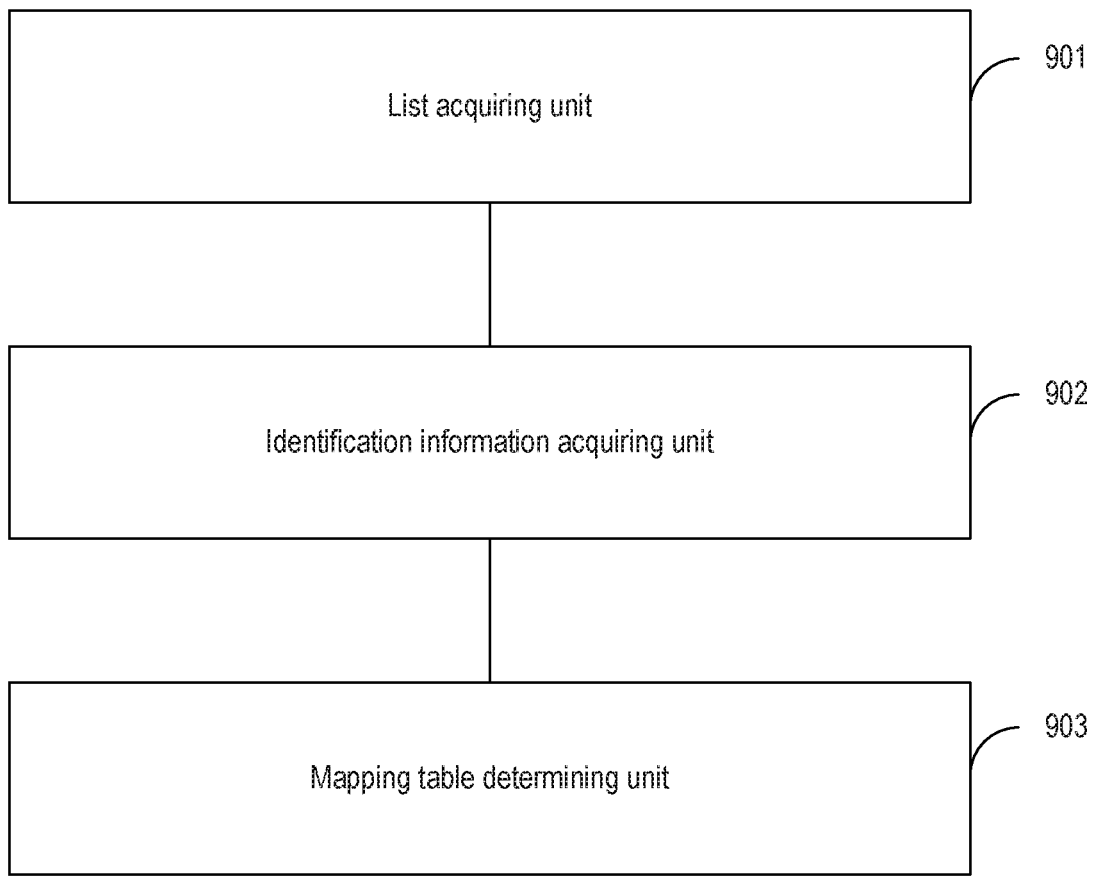
FIG. 9 is a block diagram of an exemplary apparatus for associating media content with identifiers of information associated with the media content, consistent with embodiments of the present disclosure.

FIG. 9 is a block diagram of an exemplary system 900 for generating association information between media contents and identifiers of information associated with the media contents, consistent with embodiments of the present disclosure. System 900 can be part of a management device (e.g., management device 108 of FIG. 1), and is configured to implement part of or entirety of method 400 of FIG. 4. Referring to FIG. 9, system 900 includes a list acquiring unit 901, an identification information acquiring unit 902, and a mapping table determining unit 903.

List acquiring unit 901 is configured to acquire a list of media contents from a playing device (e.g., playing device 104 of FIG. 1). System 900 and the playing device can interact with each other through an authenticated wireless connection.

Identification information acquiring unit 902 is configured to acquire identifiers of information associated with the media content. In some embodiments, identifier acquiring unit 902 is configured to implement part of or the entirety of step S402 of method 400. Identification information acquiring unit 902 can acquire an identifier from a server (e.g., server 110 of FIG. 1), and transmit a network address of a location that stores the associated information to the server, thereby enabling the server to associate the network address with the identifier. In the case where the media files stored at the playing device includes a plurality of media contents, the identifier can include a first sub-identifier associated with the media files and a second sub-identifier associated with the media contents.

Mapping table determining unit 903 is configured to determine a mapping table based on the identifiers acquired by identification information acquiring unit 902. Examples and functionalities of the mapping table have been described with respect to Tables 1-4 and are not repeated here.

Figure 10:
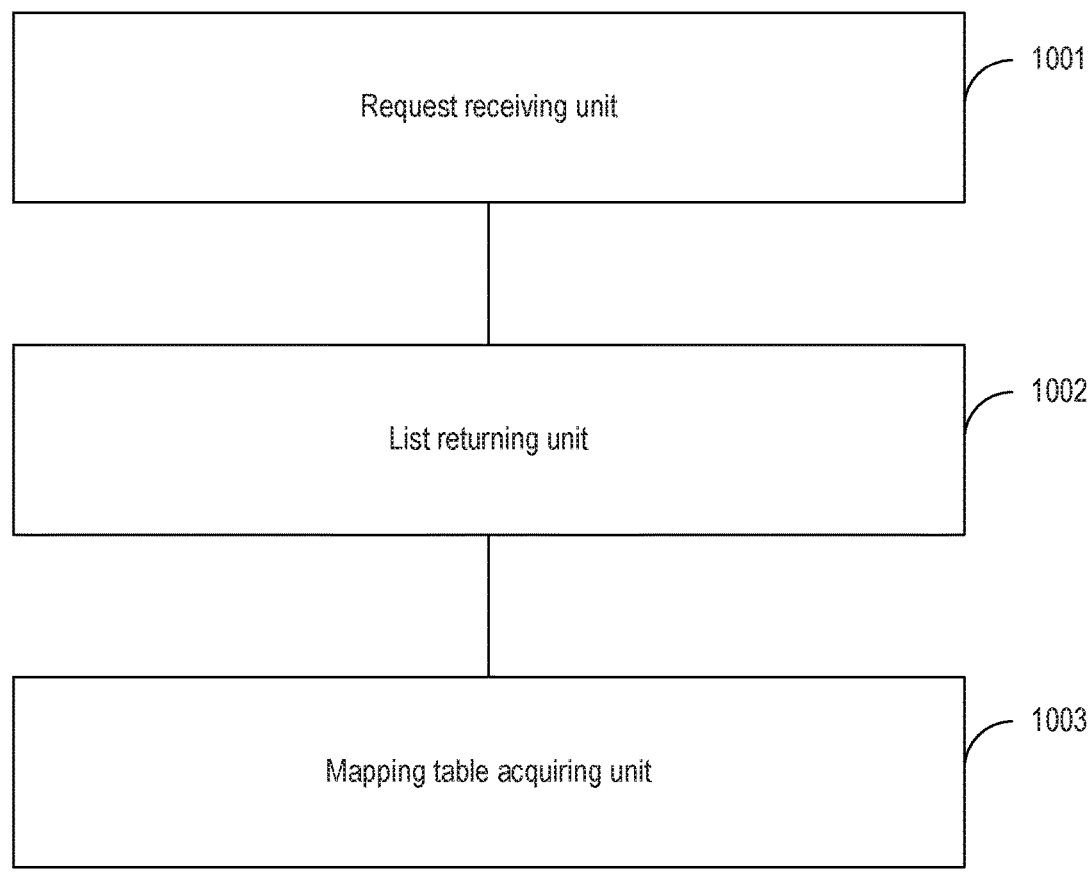
FIG. 10 is a block diagram of an exemplary apparatus for acquiring association information between media content and identifiers of information associated with the media content, consistent with embodiments of the present disclosure.

FIG. 10 is a block diagram of an exemplary system 1000 for acquiring association information between media content and identifiers of information associated with the media content, consistent with embodiments of the present disclosure. System 1000 can be part of a playing device (e.g., playing device 104 of FIG. 1), and is configured to implement part of or entirety of method 500 of FIG. 5. Referring to FIG. 10, system 1000 includes a request receiving unit 1001, a list returning unit 1002, and a mapping table acquiring unit 1003.

Request receiving unit 1001 is configured to receive, from a management device (e.g., management device 108 of FIG. 1), a request to acquire a media contents list.

List returning unit 1002 is configured to return a media contents list based on locally-stored media content.

Mapping table acquiring unit 1003 is configured to acquire a mapping table from the management device, and stores the mapping table. The mapping table associates one or more identifiers with the listed media contents. Examples and functionalities of the mapping table have been described with respect to Tables 1-4 and are not repeated here.

Figure 11:
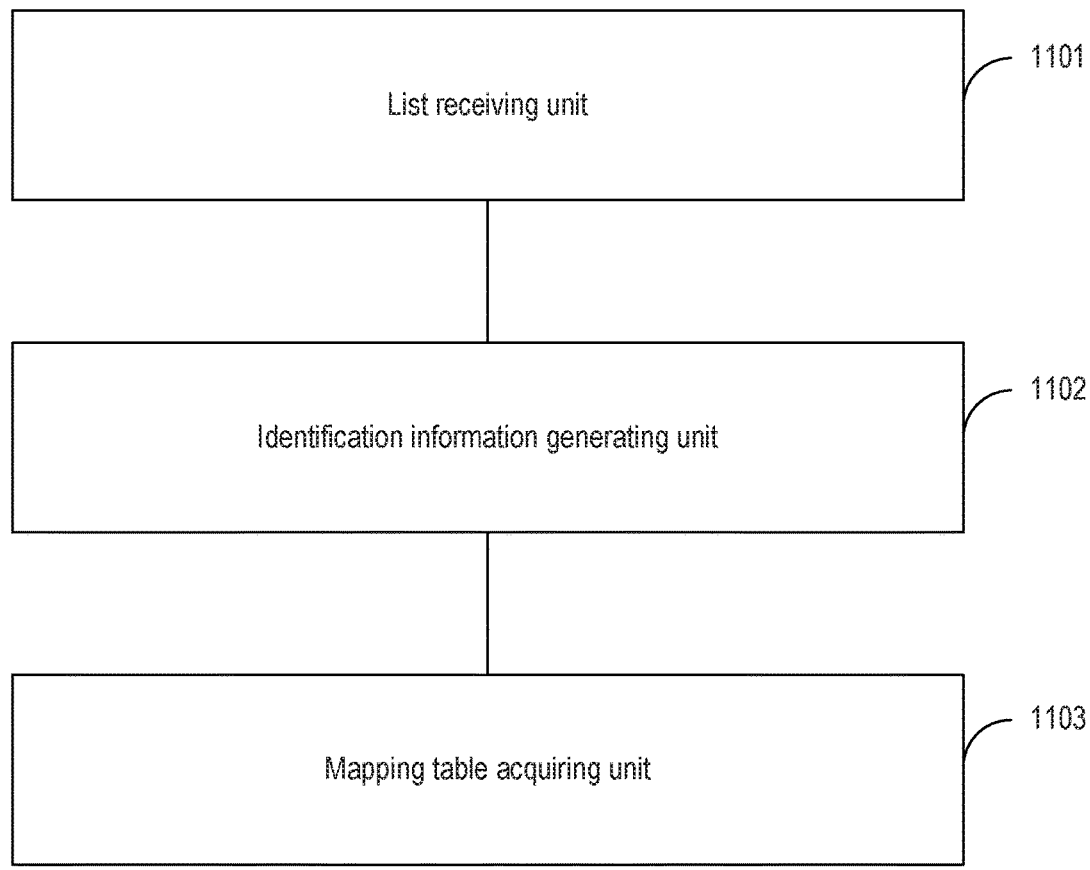
FIG. 11 is a block diagram of an exemplary apparatus for generating association information between identifiers of information and network locations of the information, consistent with embodiments of the present disclosure.

FIG. 11 is a block diagram of an exemplary system 1100 for generating association information between identifiers of information and network locations of the information, consistent with embodiments of the present disclosure. System 1100 can be part of a server (e.g., server 110 of FIG. 1), and is configured to implement part of or entirety of method 600 of FIG. 6. Referring to FIG. 11, system 1100 includes a list receiving unit 1101, an identification information generating unit 1102, and association information returning unit 1103.

List receiving unit 1101 is configured to receive, from a management device (e.g., management device 108 of FIG. 1), a media contents list. The management device receives the media contents list from a playing device (e.g., playing device 104 of FIG. 1).

Identification information generating unit 1102 is configured to generate an identifier for each of the listed media contents.

Association information returning unit 1103 is configured to return association information between the media content and the identifiers to the management device, thereby enabling the management device to create a first mapping table that associates the identifiers with the media contents. Examples and functionalities of the first mapping table have been described with respect to Tables 1-4 and are not repeated here.

System 1100 is also configured to receive network addresses of locations that store the information associated with the media content, and to store a second mapping table that associates the identifiers with the network addresses.

Examples and functionalities of the second mapping tables have been described above with respect to Tables 5-6 and are not repeated here.

Based on the foregoing descriptions of the implementations, a person skilled in the art may clearly understand that the present application may be implemented by software in addition to necessary universal hardware platform. Based on such an understanding, the technical solutions of the present application essentially, or the part contributing to the prior art may be implemented in a form of a software product. The computer software product may be stored in a storage medium, such as a ROM/RAM, a magnetic disk, and an optical disc, and include several instructions for instructing a computer device (which may be a personal computer, a server, or a network device) to perform all or a part of the methods described in the examples of the present application.

The examples of the specification are described in a progressive manner, the same or similar parts of the examples may be obtained with reference to each other, and each example emphasizes differences from other examples. Especially, systems or system examples are described relatively simple because they are basically similar to the method examples, and those related parts may be obtained with reference to the part of descriptions in the method examples. The systems and system examples described are merely exemplary, wherein the units described as separated parts may or may not be physically separate, and parts displayed as units may or may not be physical units, may be located in one position, or may be distributed on a plurality of network units. A part or all of the modules may be selected according to actual needs to achieve the objectives of the solutions of the present application. A person of ordinary skill in the art can understand and implement it without creative efforts.

The method and apparatus for providing media content provided in the present application are described in detail, specific examples are applied in the text to describe the principles and implementations of the present application, and the descriptions of the examples are merely used to help understanding of the method of the present application and core ideals thereof; meanwhile, a person of ordinary skill in the art can make variations on specific implementations and application ranges according to the ideas of the present application. In view of the above, the information of the specification should not be considered as limitation on the present application.

What is claimed is:

1. A computer-implemented method for providing information associated with media contents, the method comprising:
    broadcasting a communication address associated with a playing device configured to play the media contents, the broadcasted communication address enables a user terminal device to communicate with the playing device;
    receiving, from the user terminal device, a request to acquire information associated with a first media content;
    determining, according to a first mapping table, a first identifier corresponding to the first media content, the first mapping table including a corresponding relationship between a plurality of identifiers and a plurality of media contents; and
    transmitting the first identifier to the user terminal device;
    wherein the first identifier enables the user terminal device to provide the first identifier to a server to acquire a first network address from the server according to a second mapping table, the second mapping table including a corresponding relationship between a plurality of identifiers and a plurality of network addresses of locations that store information associated with the media contents.

2. The method of claim 1, wherein the first identifier is associated with a name of a file that stores one of the media contents; wherein determining the first identifier corresponding to the first media content comprises:
    acquiring the name of the file; and
    determining the first identifier based on the acquired name of the file.

3. The method of claim 1, wherein the first identifier includes a first sub-identifier and a second sub-identifier, the first sub-identifier being associated with a name of a file that stores the media contents, and a second sub-identifier being associated with a playing time period of one of the media contents; wherein the first network address is associated with the first and second sub-identifiers;
    wherein determining the first identifier corresponding to the first media content further comprises:
        acquiring the name of the file;
        determining the first sub-identifier based on the acquired name; and
        determining the second sub-identifier based on a current playing time period.

4. The method of claim 1, further comprising:
    determining a subsequent playing time period according to a current playing time period;
    determining, based on the determined subsequent playing time period, a second identifier corresponding to a second media content; and
    transmitting the second identifier to the user terminal device to enable the user terminal device to provide the second identifier to the server to acquire a second network address from the server.

5. The method of claim 1, wherein the user terminal device and the playing device communicate via an unauthenticated wireless connection.

6. The method of claim 1, wherein the first network address is a Uniform Resource Locator (URL) of a location that stores the information associated with the first media content.

7. The method of claim 1, wherein the first identifier is no more than 30 bytes.

8. The method of claim 1, wherein the first identifier is transmitted to the user terminal device in a single data packet.

9. An apparatus for providing information associated with media contents, the apparatus comprising:
    a memory that stores a set of instructions; and
    a processor being configured to execute the set of instructions to cause the apparatus to perform:
        broadcasting a communication address associated with a playing device configured to play the media contents, the broadcasted communication address enables a user terminal device to communicate with the playing device;
        receiving, from the user terminal device, a request to acquire information associated with a first media content;
        determining, according to a first mapping table, a first identifier corresponding to the first media content, the first mapping table including a corresponding relationship between a plurality of identifiers and a plurality of media contents; and transmitting the first identifier to the user terminal device;
wherein the first identifier enables the user terminal device to provide the first identifier to a server to acquire a first network address from the server according to a second mapping table, the second mapping table including a corresponding relationship between a plurality of identifiers and a plurality of network addresses of locations that store information associated with the media contents.

10. The apparatus of claim 9, wherein the first identifier is associated with a name of a file that stores one of the media contents; wherein determining the first identifier corresponding to the first media content comprises:
acquiring the name of the file; and
determining the first identifier based on the acquired name of the file.

11. The apparatus of claim 9, wherein the first identifier includes a first sub-identifier and a second sub-identifier, the first sub-identifier being associated with a name of a file that stores the media contents, and a second sub-identifier being associated with a playing time period of one of the media contents; wherein the first network address is associated with the first and second sub-identifiers;
wherein determining the first identifier corresponding to the first media content further comprises:
acquiring the name of the file;
determining the first sub-identifier based on the acquired name; and
determining the second sub-identifier based on a current playing time period.

12. The apparatus of claim 9, wherein the processor is configured to execute the set of instructions to cause the apparatus to further perform:
determining a subsequent playing time period according to a current playing time period;
determining, based on the determined subsequent playing time period, a second identifier corresponding to a second media content; and
transmitting the second identifier to the user terminal device to enable the user terminal device to provide the second identifier to the server to acquire a second network address from the server.

13. The apparatus of claim 9, wherein the user terminal device and the playing device communicate via an unauthenticated wireless connection.

14. The apparatus of claim 9, wherein the first network address is a Uniform Resource Locator (URL) of a location that stores the information associated with the first media content.

15. The apparatus of claim 9, wherein the first identifier is no more than 30 bytes.

16. The apparatus of claim 9, wherein the first identifier is transmitted to the user terminal device in a single data packet.

17. A non-transitory computer readable medium that stores a set of instructions that is executable by at least one processor of a display device to cause the display device to perform a method for providing information associated with media contents, the method comprising:
broadcasting a communication address associated with the playing device configured to play the media contents, the broadcasted communication address enables a user terminal device to communicate with the playing device;
receiving, from the user terminal device, a request to acquire information associated with a first media content;
determining, according to a first mapping table, a first identifier corresponding to the first media content, the first mapping table including a corresponding relationship between a plurality of identifiers and a plurality of media contents; and
transmitting the first identifier to the user terminal device;
wherein the first identifier enables the user terminal device to provide the first identifier to a server to acquire a first network address from the server according to a second mapping table, the second mapping table including a corresponding relationship between a plurality of identifiers and a plurality of network addresses of locations that store information associated with the media contents.

18. The medium of claim 17, wherein the set of instructions that is executable by the at least one processor of the display device to cause the display device to further perform:
acquiring the name of the file; and
determining the first identifier based on the acquired name of the file.

19. The medium of claim 17, wherein the first identifier includes a first sub-identifier and a second sub-identifier, the first sub-identifier being associated with a name of a file that stores the media contents, and a second sub-identifier being associated with a playing time period of one of the media contents; wherein the first network address is associated with the first and second sub-identifiers;
wherein determining the first identifier corresponding to the first media content further comprises:
acquiring the name of the file;
determining the first sub-identifier based on the acquired name; and
determining the second sub-identifier based on a current playing time period.

20. The medium of claim 17, wherein the set of instructions that is executable by the at least one processor of the display device to cause the display device to further perform:
determining a subsequent playing time period according to a current playing time period;
determining, based on the determined subsequent playing time period, a second identifier corresponding to a second media content; and
transmitting the second identifier to the user terminal device to enable the user terminal device to provide the second identifier to the server to acquire a second network address from the server.

21. The medium of claim 17, wherein the user terminal device and the playing device communicate via an unauthenticated wireless connection.

22. The medium of claim 17, wherein the first network address is a Uniform Resource Locator (URL) of a location that stores the information associated with the first media content.

23. The medium of claim 17, wherein the first identifier is no more than 30 bytes.

24. The medium of claim 17, wherein the first identifier is transmitted to the user terminal device in a single data packet.

* * * * *